United States Patent
Liesegang

(10) Patent No.: US 7,021,167 B2
(45) Date of Patent: Apr. 4, 2006

(54) ROTARY JOINT MECHANISM

(75) Inventor: Hans-Jürgen Liesegang, Schortens (DE)

(73) Assignee: AB SKF, Gothenburg (SE)

( * ) Notice: Subject to any disclaimer, the term of this patent is extended or adjusted under 35 U.S.C. 154(b) by 125 days.

(21) Appl. No.: 10/224,431

(22) Filed: Aug. 21, 2002

(65) Prior Publication Data

US 2003/0051566 A1    Mar. 20, 2003

(30) Foreign Application Priority Data

Sep. 18, 2001  (DE) .......................... 201 15 350 U

(51) Int. Cl.
*F16H 19/00*     (2006.01)
*F16H 55/36*     (2006.01)

(52) U.S. Cl. ......................................... 74/63; 74/89.22

(58) Field of Classification Search ................. 74/63, 74/89.22; 212/246, 239, 253; 254/371, 254/372, 374; 414/687, 694, 695.6, 744.1, 414/744.2, 744.7

See application file for complete search history.

(56) References Cited

U.S. PATENT DOCUMENTS

| | | | | |
|---|---|---|---|---|
| 903,997 A | * | 11/1908 | Martinson | 254/305 |
| 931,703 A | * | 8/1909 | Page | 212/246 |
| 1,583,936 A | * | 5/1926 | Noble | 212/246 |
| 1,606,628 A | * | 11/1926 | Gros | 212/169 |
| 1,975,296 A | * | 10/1934 | Ross | 384/547 |
| 2,645,360 A | * | 7/1953 | Raymond | 212/296 |
| 3,409,047 A | * | 11/1968 | Jameson | 137/615 |
| 3,489,467 A | * | 1/1970 | Blackburn | 384/474 |
| 6,050,728 A | * | 4/2000 | Obara et al. | 384/613 |
| 6,170,350 B1 | * | 1/2001 | Behm | 74/425 |
| 6,622,580 B1 | * | 9/2003 | Chang et al. | 74/63 |

FOREIGN PATENT DOCUMENTS

DE       198 14 629 A1     9/1999

* cited by examiner

*Primary Examiner*—William C Joyce
(74) *Attorney, Agent, or Firm*—Buchanan Ingersoll PC

(57) ABSTRACT

A rotary joint mechanism for connecting two machine parts to effect relative movement between the two machine parts includes an outer ring adapted to be connected to a rotatable machine part, and an inner ring adapted to be connected to a fixed machine part, with the outer ring being rotatable relative to the inner ring. The outer surface of the outer ring is provided with a mechanism for transferring force from at least one cable element to the outer ring to effect rotation of the outer ring relative to the inner ring.

14 Claims, 3 Drawing Sheets

ROTARY JOINT MECHANISM

FIELD OF THE INVENTION

The present invention generally relates to a rotary joint. More particularly, the present invention pertains to rotary joints used in, for example, cranes, wind power plants and the like.

BACKGROUND OF THE INVENTION

Rotary joints are used in a variety of different applications including construction machinery, rotary cranes, and frequently also in wind power plants, although the uses are not limited in this regard. In such cases, it is generally necessary with the use of a generic rotary joint, in addition to effecting the rotatable connection of two machine or system parts, to also transfer for the active rotation of one of the two machine or system parts, a drive moment to this machine or system part, with the drive moment being usually provided by an electric or hydraulic drive.

German Offenlegungsschrift No. DE 198 14 629 A1 discloses an arrangement for rotatably positioning the machine pod of a wind power plant. The torque is transferred from the rotatable machine pod to the fixed tower by way of electromotive drives. Each of the drives is provided with a toothed gear pinion, each of which engages an encircling toothing disposed on the tower or on the fixed bearing ring of the rotary joint, whereby the motor rotation of the machine pod relative to the tower is made possible.

A generic rotary joint formed in this way is, however, laborious and thus expensive to manufacture, and also has a significant maintenance requirement. This maintenance includes the regular lubrication or cyclical cleaning of the toothed gear and the drive pinion. Beyond this, as for all toothed gears, the toothing of the pinion and the toothed ring must be aligned very precisely relative to one another to avoid reductions in the life and/or provide security against failure of the drive.

The high expenditure in production of a rotary joint of this type arises by virtue of the production of the toothing of the encircling toothed gear and also the production of the toothing on the drive pinion(s). This is so because the toothing of the toothed rim of the drive must be milled in a known, laborious manner with precision tools and subsequently subjected to heat treatment for tempering the edges of the teeth. In a similar manner, the toothing of the drive pinion must also be produced and heat-treated. Moreover, a torque transfer of this type requires, on account of the toothed gear, the pinion and the assigned drive motors, a not insignificant space in the immediate area of the rotary joint. Such space is not available in all cases.

A need thus exists for a rotary joint which allows a drive moment to be transferred to one of the bearing rings, yet which can be more cost-effectively produced. It would also be desirable to provide a rotary joint which requires relatively small mounting and maintenance expense, while also permitting greater flexibility relative to the arrangement of the torque-generating and torque-transferring machine elements.

SUMMARY OF THE INVENTION

The rotary joint mechanism includes a bearing outer ring and a bearing inner ring, with the outer ring and the inner ring being rotatably connected to one another. In the context of the disclosed rotary joint, the outer ring and inner ring are thus relatively rotatable. The outer ring and inner ring can lie slidingly on one another. Alternatively roller bodies (e.g., bearing rollers) can be positioned between the outer ring and the inner ring.

To transfer the drive moment to the outer ring, the outer ring is provided, according to the invention, with means for effecting the transfer of force to the outer ring by at least one cable element. The way in which the transfer of force from the cable element to the outer ring to be moved is achieved is thus significant in the context of the rotary joint. According to a preferred embodiment of the invention, the transfer of force from the cable element to the outer ring to be moved is accomplished by way of a friction lock (e.g., by virtue of friction between the cable element and the bearing ring) and/or by way of a force lock (e.g., by virtue of a fixing mechanism securing the cable element to the bearing ring) between the cable element and the bearing ring (outer ring). A transfer of force by way of a friction lock has in particular the advantage that the forces to be transferred can be distributed over a relatively large surface, whereby the demand for material is kept relatively low with respect to the outer ring, as well as with respect to the cable element.

The mechanism for effecting the transfer of force includes a cable groove disposed on the outer diameter or outer surface of the outer ring to be moved. The cable groove preferably completely encircles the outer diameter or outer surface of the outer ring. Through a preferably encircling cable groove of this type, an automatic guiding and centering of the force transferring cable element is assured in a relatively simple way. Further, the frictional forces between the cable element and the outer ring required for the transfer of force can be increased due to the accommodation of the cable element in the cable groove.

In a particularly preferred embodiment, the cable groove disposed on the outer diameter or outer surface of the outer ring is in the form of several windings arranged on the outer diameter or outer surface of the outer ring in a helical manner. With a cable groove formed in the manner of a helix or a cable drum, the frictional forces necessary for transferring high torques in particular can be increased further without the cable tension having to be increased.

According to a further preferred embodiment, a device for fastening the cable element to the outer ring or in the cable groove is disposed in the area of the cable groove. By way of example, the device for fastening can be in the form of a screw apparatus by which the cable element is fixedly clamped on the outer ring or in the cable groove formed in the outer surface of the outer ring. By virtue of the fastening device, the cable element is fastened to the outer ring so that it does not become lost or separated from the outer ring. In addition, this allows a part of the driving force, or alternatively the entire driving force, to be transferred from the cable element to the outer ring.

The manner in which the driving forces necessary to move the rotatable outer ring, and the machine or system parts associated with the outer ring, are produced for transfer to the cable element can take several forms. For example, in the case of smaller rotary joints or in the case of applications requiring only occasional actuation, the transfer of the driving force to the cable element can be effected by way of a hand crank. According to a preferred embodiment, the rotary joint includes a motor-drivable or motor-driven device which produces the driving forces that are transferred to the cable element and then subsequently to the outer ring. The drive device preferably includes at least one cable spindle.

According to further aspects, the motor-drivable or motor-driven device can also include two cable spindles which are driven with speeds of revolution synchronized to one another, or individually driven or braked, depending on the desired speed of rotation. Thus, by way of example, the cable element for the transfer of forces to the outer ring to be moved can be guided from a first motor-driven cable spindle in several windings over the helical cable groove on the outer ring to a second cable spindle which is also motor-drivable or motor-driven.

According to another aspect of the invention, a rotary joint mechanism connecting a rotatable machine part to a fixed machine part includes an outer ring connected to the rotatable machine part, an inner ring connected to the fixed machine part and rotatable relative to the outer ring, at least one motor driven cable spindle, and at least one cable element extending from the at least one motor driven cable spindle and to the outer ring, with the at least one cable element extending around the outer surface of the outer ring to transfer a driving force from the at least one motor driven cable spindle to the outer ring to rotate the outer ring relative to the inner ring.

In accordance with another aspect, a rotary joint mechanism connecting two machine parts includes an outer ring connected to a rotatable machine part, an inner ring connected to a fixed machine part and rotatable with respect to the outer ring, and at least one cable element. The outer surface of the outer ring is provided with means for transferring force from at least one cable element to the outer ring.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
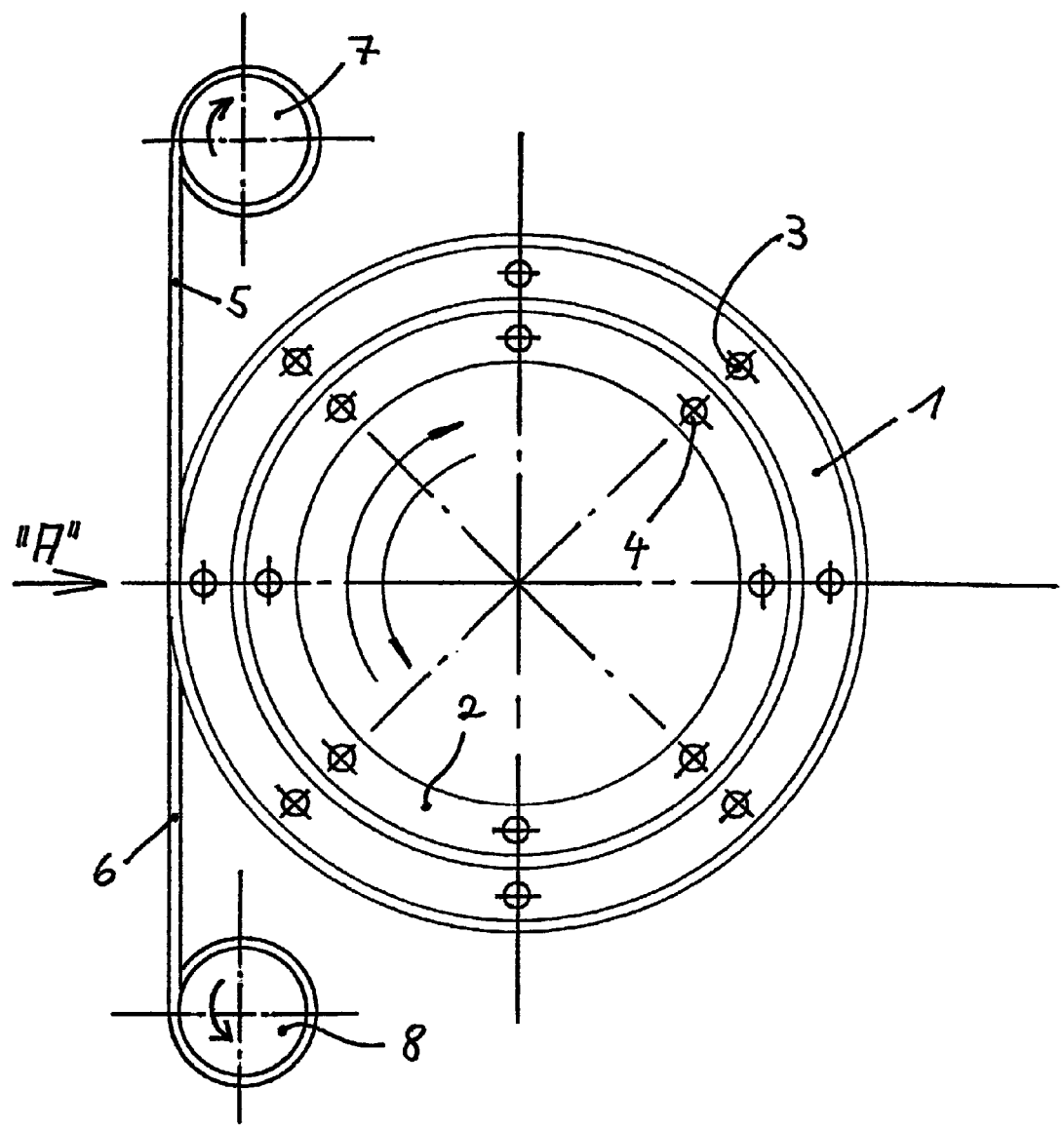
FIG. 1 is a schematic plan view, not to scale of, an embodiment of a rotary joint mechanism according to the invention.

FIG. 1 illustrates a rotary joint mechanism comprised of a rotary joint that includes an outer ring 1 and an inner ring 2. The outer ring 1 is adapted to be connected to a rotatable machine or system part. For this purpose, the outer ring 1 is provided with connecting holes 3. The inner bearing ring 2 is also provided with connecting holes 4 so that the inner ring 2 can be connected to a fixed machine or system part.

FIG. 1 also shows that the rotary joint mechanism includes a cable element 5, 6 stretched between two drive spindles 7, 8 so that it encircles the outer ring 1 of the rotary joint one or more times (i.e. one or more complete revolutions). This construction provides a relatively simple way for driving the outer bearing ring 1 by way of the transmission of force through the cable element 5, 6.

Figure 2:
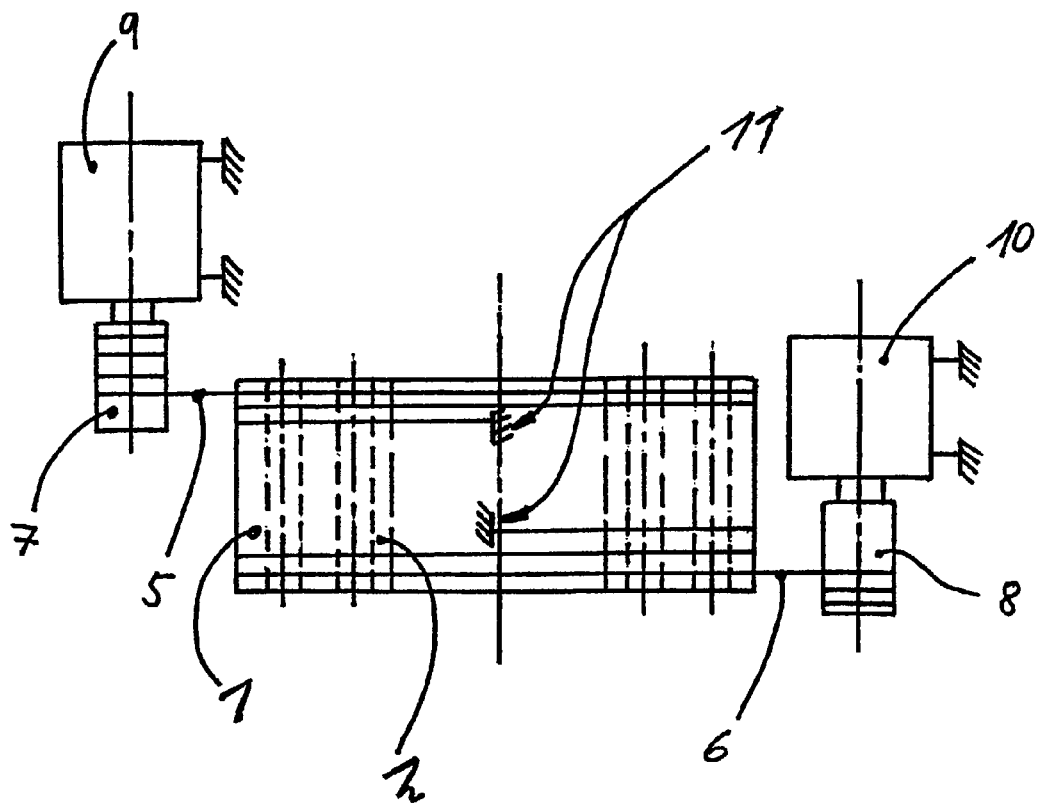
FIG. 2 is a side view of the rotary joint mechanism shown in FIG. 1.

FIG. 2 is a side view of the rotary joint mechanism shown in FIG. 1 as seen from the direction indicated by the arrow A in FIG. 1. It can be seen that in the case of this embodiment of the rotary joint mechanism according to the invention, the cable element is in the form of two separate cable elements 5, 6, each of which is arranged to extend helically around the outer ring 1 of the rotary joint.

Each of the cable elements 5, 6 extends or is stretched between the outer ring 1 and a respective motor-drivable cable spindle 7, 8. In addition, fastening or clamping devices 11 are provided to anchor, fix or fasten the respective cable elements 5, 6 to the outer bearing ring 1. The fastening or clamping devices 11 for effecting a force-lock can be embodied in the form of, for example, a screw apparatus or clamping screw, a counterpiece to an eyelet fastened to the cable element 5, 6, a nipple, or an adhesive connection. In the case of metallic cable elements 5, 6, a soldered or welded connection between the cable elements and the outer bearing ring 1 is also possible. The implementation of the fastening or clamping device 11 depends on whether the fastening or clamping device is intended to simply protect against loss (i.e., separation of the cable elements from the outer bearing ring 1) or whether the fastening or clamping device 11 must also take up or withstand the driving forces to a significant degree.

The cable spindles 7, 8 can each be driven by a respective motor drive unit 9, 10. The outer ring 1, as well as the machine or system part connected to the outer ring 1, can thus be definitely turned with respect to the inner ring 2 by virtue of each of the two spindles 7, 8 being set in rotation in the same sense and essentially synchronously by the respective motor drive units 9, 10. Alternatively, depending on the intended direction of rotation of the outer ring 1, one of the two cable spindles 7, 8 can be set in rotation by one of the two motor drive units 9, 10 while the other cable spindle 8, 7 is entrained empty (free to rotate) or is braked slightly to maintain the cable tension.

Due to the multiple helical windings of the cable elements 5, 6 about the outer ring 1, very high forces of friction can be transferred from the cable element 5, 6 to the outer ring 1 without the fastening device 11 of the cable elements being exposed to great tensile forces. Furthermore, a motor-driven rotary joint can also be obtained by suitable selection of the motor drive units 9, 10, as well as the diameter of the cable spindles 7, 8, with the rotary joint being sufficient without additional gears in the drive units 9, 10. This further reduces the complexity of the rotary joint, as well as the production and maintenance costs, of the rotary joint.

By virtue of the rotary joint mechanism of the present invention, examples of which has been described in connection with the disclosed and illustrated embodiments, it is possible without further significant effort to dispose the drive units 9, 10 at nearly arbitrary points in the machine or system, for which only the cable elements 5, 6 must be correspondingly lengthened, and possibly also in certain cases guided over simple deflection rollers. This is particularly advantageous when, in the immediate vicinity of the rotary joint, only very little space for accommodating the drive units 9, 10 is available. This is relatively often the case with the pods of wind power plants so that the pods can be kept as small as possible.

Figure 3:
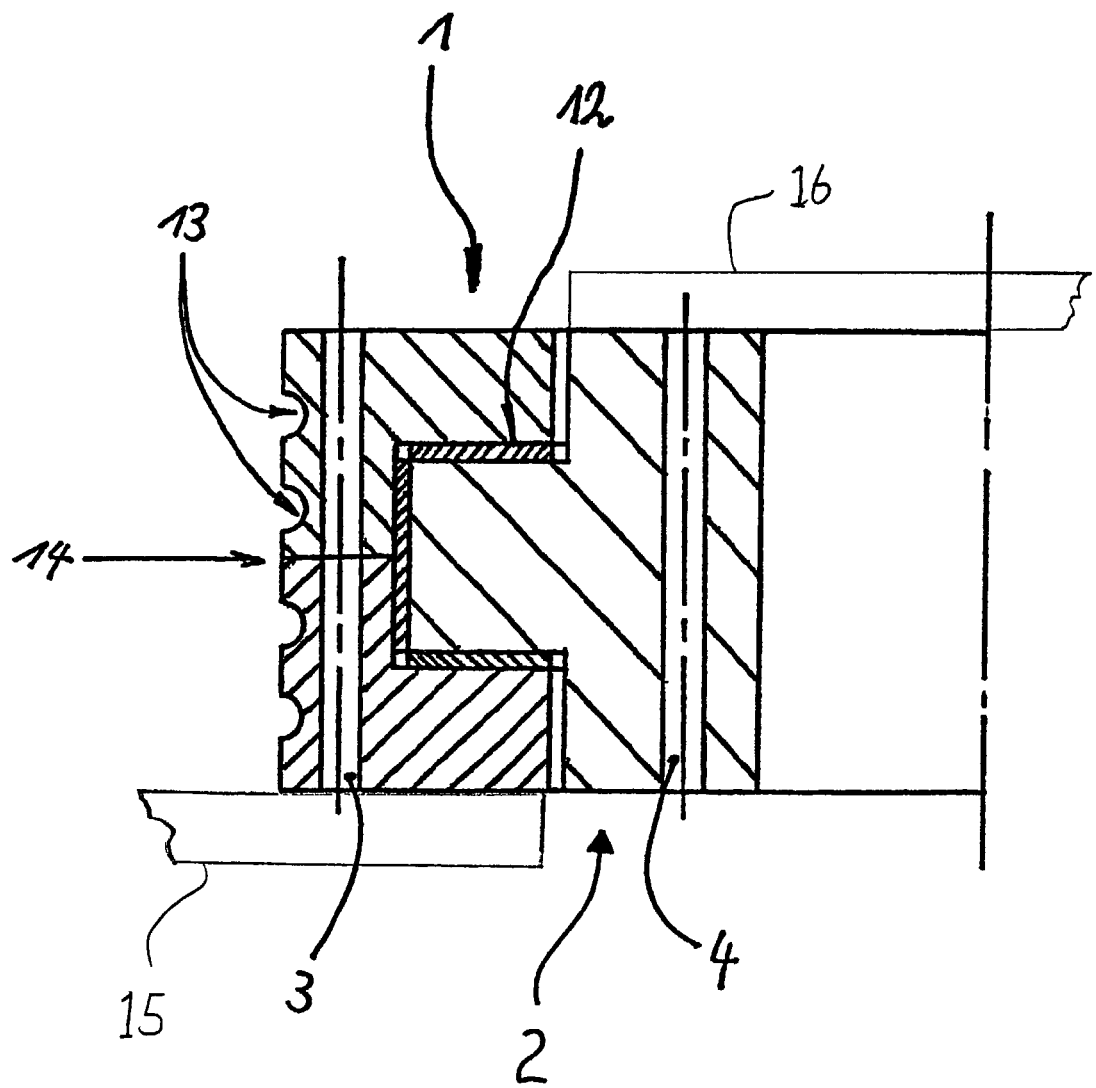
FIG. 3 is a schematic axial cross-sectional view of a rotary joint mechanism according to the invention.

FIG. 3 illustrates in cross-section an embodiment exemplifying a rotary joint according to the present invention. The illustrated rotary joint includes the outer ring 1 as well as the inner ring 2, with the inner ring including a radially outwardly directed projection(s) positioned in an annular groove provided in the inner surface of the outer ring 1. The outer ring 1 is divided into two parts at a parting line or dividing plane 14 to enable the outer ring 1 and the inner ring 2 of the rotary joint to be assembled.

The rotary joint according to FIG. 3 is a sliding rotary joint in which the guide faces of the outer ring 1 and/or the inner ring 2 are covered with sliding plates 12 of metal or plastic. This contributes to providing accessibility, low maintenance, and a relatively long life-time of the rotary joint. FIG. 3 also illustrates the cable groove(s) 13 disposed on the outer ring 1. The cable elements (not illustrated in FIG. 3) which serve to transfer force to the rotary joint, and which can be similar to the cable element(s) described above and shown in FIGS. 1 and 2, are accommodated and guided in the cable grooves 13. These cable elements can also be connected to spindles driven by motor drives in a manner similar to that described above. The holes 3, 4 in the outer ring 1 and the inner ring 2 serve for fastening the respective bearing rings to the machine or system parts to be connected rotatably. The rotatable machine or system part 15 to which the outer bearing ring 1 is connected and the fixed machine or system part 16 to which the inner bearing ring 2 is connected are also schematically shown in FIG. 3.

As described above, the driving force necessary to move the rotatable outer ring and the machine or system parts associated with the outer ring is produced for transfer to the cable element by way of the motor driven cable spindle(s). However, variations on this arrangement are possible. For example, in the case of smaller rotary joints or applications requiring only occasional actuation, the motor drive unit(s) can be replaced by a hand crank. In addition, rather than utilizing two separate cable elements, it is possible to use a single cable element. The single cable element for the transfer of forces to the outer ring to be rotated can be guided from a first motor-driven cable spindle in several windings over the outer surface of the outer ring, for example in a helical cable groove on the outer ring, to a second cable spindle which is also motor-drivable or motor-driven.

By virtue of the rotary joint implemented in accordance with the invention, significant simplifications in construction can be realized. In addition, due in significant respect to the omission of expensive toothing, quite significant cost savings in manufacture and maintenance of the rotary joint can also be achieved.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotary joint mechanism connecting a rotatable machine part to a fixed machine part comprising:
    a bearing outer ring connected to the rotatable machine part, the bearing outer ring being integrally formed with a bearing and having an outer surface;
    an inner ring connected to the fixed machine part, the bearing outer ring being rotatable with respect to the inner ring;
    the bearing outer ring surrounding the inner ring;
    at least one motor driven cable spindle;
    at least one cable element extending from the at least one motor driven cable spindle and to the bearing outer ring, the at least one cable element extending around and contacting the outer surface of the bearing outer ring to transfer a driving force from the at least one motor driven cable spindle to the bearing outer ring to rotate the bearing outer ring relative to the inner ring; and
    wherein the outer surface of the bearing outer ring is provided with a helically extending groove, the at least one cable element being positioned in the groove.

2. The rotary joint mechanism according to claim 1, wherein the groove extends helically around the outer surface of the bearing outer ring for a plurality of revolutions.

3. The rotary joint mechanism according to claim 2, wherein the groove is provided with a fastening device fastening the at least one cable element to the bearing outer ring.

4. The rotary joint mechanism according to claim 1, wherein the at least one cable element includes first and second cable elements separate from one another, the first cable element extending from the at least one motor driven cable spindle and the second cable element extending from a second cable spindle.

5. The rotary joint mechanism according to claim 1, including a fastening device fixing the at least one cable element to the bearing outer ring.

6. The rotary joint mechanism according to claim 1, including a pair of motor driven cable spindles to which the at least one cable element is connected to transfer the driving force to the at least one cable element, the motor driven cable spindles being rotatably driven with a synchronous speed of revolution.

7. A rotary joint mechanism connecting a rotatable machine part to a fixed machine part comprising:
    a bearing outer ring connected to the rotatable machine part, the bearing outer ring being integrally formed with a bearing and having an outer surface;
    an inner ring connected to the fixed machine part, the bearing outer ring being rotatable with respect to the inner ring;
    the bearing outer ring surrounding the inner ring;
    at least one motor driven cable spindle;
    at least one cable element extending from the at least one motor driven cable spindle and to the bearing outer ring, the at least one cable element extending around and contacting the outer surface of the bearing outer ring to transfer a driving force from the at least one motor driven cable spindle to the bearing outer ring to rotate the bearing outer ring relative to the inner ring; and
    a fastening device fastening the at least one cable element to the outer surface of the bearing outer ring.

8. The rotary joint mechanism according to claim 7, wherein the outer surface of the bearing outer ring is provided with a helically extending groove, the at least one cable element being positioned in the groove.

9. The rotary joint mechanism according to claim 7, further comprising a groove disposed on the outer surface of the bearing outer ring, the at least one cable element being positioned in the groove.

10. The rotary joint mechanism according to claim 9, wherein the groove extends around the outer surface of the bearing outer ring at least one complete revolution.

11. The rotary joint mechanism according to claim 9, wherein the groove extends helically around the outer surface of the bearing outer ring for a plurality of revolutions.

12. The rotary joint mechanism according to claim 9, wherein the groove in the bearing outer ring includes the fastening device fastening the at least one cable element to the bearing outer ring.

13. The rotary joint mechanism according to claim 7, wherein the at least one cable element includes first and second cable elements separate from one another, the first cable element extending from the at least one motor driven cable spindle and the second cable element extending from a second cable spindle.

14. The rotary joint mechanism according to claim 7, including a pair of motor driven cable spindles to which the at least one cable element is connected to transfer the driving force to the at least one cable element, the motor driven cable spindles being rotatably driven with a synchronous speed of revolution.

* * * * *